United States Patent [19]

Siegel

[11] Patent Number: 4,754,628
[45] Date of Patent: Jul. 5, 1988

[54] LUG LOCK

[76] Inventor: Myron Siegel, 29 Lexington Ave., Brooklyn, N.Y. 11238

[21] Appl. No.: 36,366

[22] Filed: Apr. 8, 1987

[51] Int. Cl.$^4$ .............................................. F16B 41/00
[52] U.S. Cl. ......................................... 70/230; 70/232
[58] Field of Search .................... 70/230, 232, 229, 58, 70/DIG. 57; 248/551–553

[56] References Cited

U.S. PATENT DOCUMENTS

| | | | |
|---|---|---|---|
| 2,534,446 | 12/1950 | Howard | 70/231 |
| 2,755,655 | 7/1956 | Maffey | 70/232 |
| 4,557,458 | 12/1985 | Vahlberg | 70/232 |

*Primary Examiner*—Robert L. Wolfe
*Attorney, Agent, or Firm*—Richard L. Miller

[57] ABSTRACT

This lock is designed to prevent unauthorized removal of the wheels of large trucks and buses. Primarily, it consists of a housing that is received on the nut fastener and the studs that hold the wheels on the vehicle, and a locking mechanism that is key operable, is provided with a bolt that is received in an annular groove proved in the nut fasteners. The bolt of the locking mechanism is also provided with an annular groove and head that cooperate with a pin in the housing to prevent disengagement with the nut fasteners when the lock is in locked position.

5 Claims, 1 Drawing Sheet

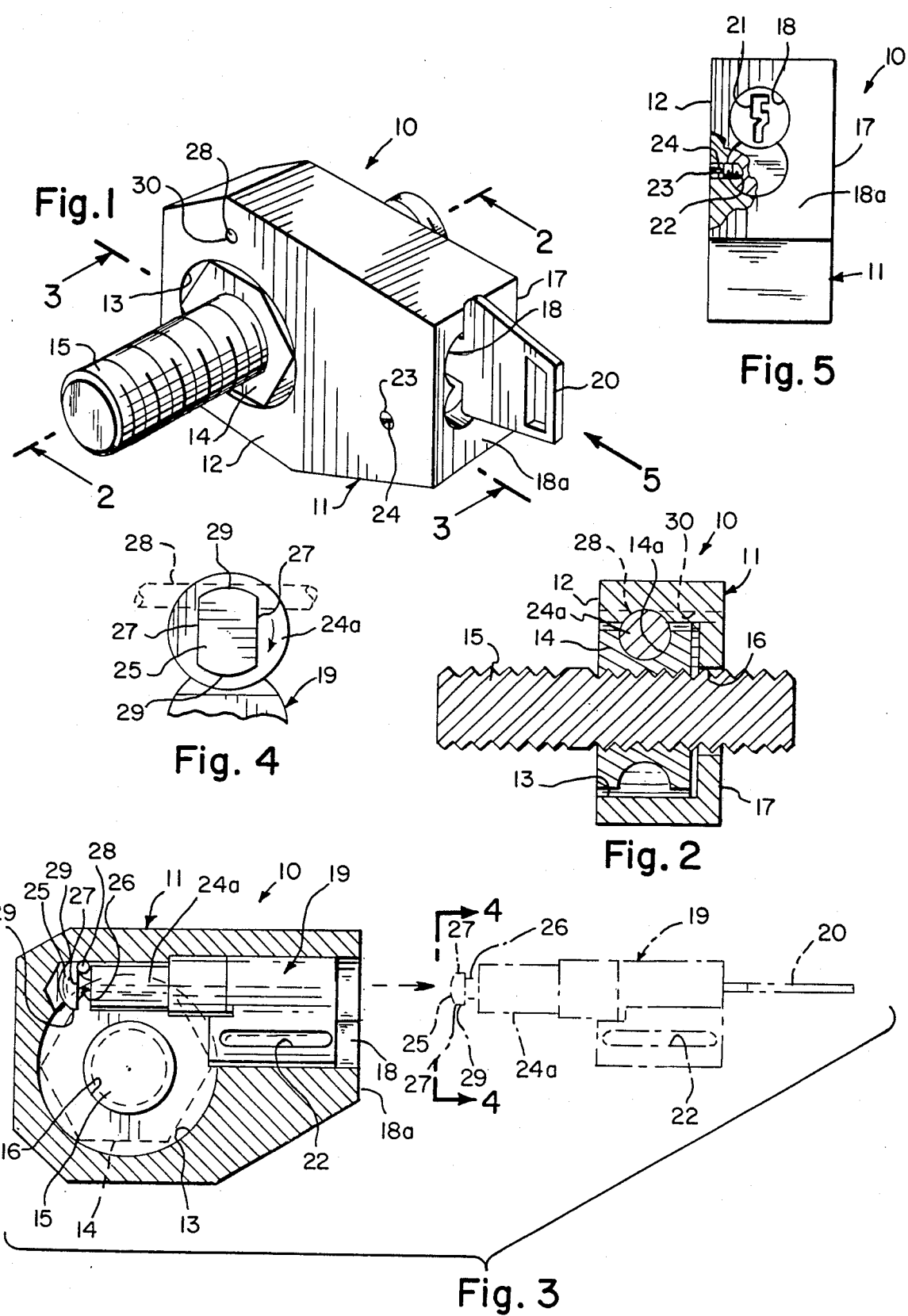

LUG LOCK

BACKGROUND OF THE INVENTION

The instant invention relates generally to security devices, and particularly, to a lug lock.

Numerous locks have been provided in the prior art that are adapted to various purposes. While these units may be suitable for the particular purpose to which they address, they will not be as suitable for the purposes of the present invention, as hereafter described.

SUMMARY OF THE INVENTION

A primary objective of the present invention is to provide a lug lock that will overcome the short comings of the prior art devices.

Another object is to provide a lug lock, which will be unique in design, in that it will be adaptable to be employed on large automotive vehicles, so as to prevent removal of their wheel lugs and the subsequent theft off the wheels thereof.

Another object is to provide a lug lock, which will be of such design, as to be adaptable to prevent the removal of fasteners from any type stud or the like.

An additional object is to provide a lug lock, which will include a block or housing for being received on a stud and fastener, and the housing will be provide with a rotary bolt operated by key means to retain the lug or fastener.

A further object is to provide a lub lock that is simple and easy to use.

A still further object is to provide a lug lock that is economical in cost to manufacturer.

Further objects of the invention will appear as the description proceeds. To the accomplishment of the above and related objects, this invention may be embodied in the form illustrated in the accompanying drawings, attention being called to fact, however, that the drawings are illustrative only and that changes may be made in the specific construction illustrated and described within the scope of the appended claims.

BRIEF DESCRIPTION OF THE DRAWING FIGURES

The figures in the drawing are briefly described as follows:

FIG. 1 is a perspective view of the present invention;

FIG. 2 is a cross-sectional view taken along the line 2—2 of FIG. 1;

FIG. 3 is a cross-sectional view taken along the line 3—3 of FIG. 1 and illustrating the lock portion removed therefrom, in phantom;

FIG. 4 is an enlarged fragmentary view, taken along the line 4—4 of FIG. 3 and illustrating the stop pin of the invention in phantom, and FIG. 5 is a view taken in the direction of arrow 5 in FIG. 1, with parts broken away so as to illustrate further construction details.

DETAILS DESCRIPTION OF THE PREFERRED EMBODIMENT

Turning now descriptively to the drawings, in which like reference characters denote like elements throughout the several views, a lock 10 is shown to include a housing 11 preferably fabricated of a non-corrosive metal. In one side 12, a large diameter opening 13 is provided and freely receives a nut fastener 14 that threads onto a threaded stud 15, such as found on wheel portions of large automotive vehicles, such as, trucks, buses and the like. A small diameter opening 16 through the other side 17 of housing 11, aligns on the longitudinal axis of opening 13 and freely receives an end portion of stud 15, and an opening 18 through an end 18a housing 11, removably receives a lock mechanism 19 that is operable by key 20 receivable in key opening 21. A horizontal cut-out groove 22 is provided in one side of lock mechanism 19, and receives a set screw 23. The set screw 23 is further received threadably in opening 24 provided through side 12 and provides a way of retaining lock mechanism 19 within housing 11.

Referring now particularly to FIGS. 3 and 4, a bolt 24a of lock mechanism 19 includes a substantially rectangular head 25 that is integrally attached to one end of bolt 24a, and is defined by annular groove 26. Bolt 24a is rotatable by the turning of key 20 and is received in the confines of the annular groove 14a provided in fastener 14, to prevent movement of fastener 14 when lock 10 is in locked condition thereon. The flat sides 27 of head 25 of bolt 26, are designed to clear pin 28 when lock 10 is in the unlocked condition, and the arcuate portions 29 are designed as lip means to engage with the outer periphery of pin 28 when lock 10 is in the locked condition. Pin 28 is press-fit in opening 30 of housing 11 and is additionally received in the annular groove 26 of bolt 24a.

In operation, the fastener 14 is first tightened by a suitable wrench and the housing 11 is then placed on the fastener 14 until the fastener is substantially flush with the side face 12, which in most instances will leave the stud 15 projecting partially from the small diameter opening 16. The key 20 is then rotated while pushing inward causing lock mechanism 19 to move inward and the bolt 24a to be received in the annular groove 14a of fastener 14. As the above occurs, an arcuate portion 19 of head 25 engages behind pin 28 and prevents bolt 24a from being withdrawn, and thus, fastener 14 is prevented from being removed from stud 15 until the key 20 is again employed to reverse the procedure above described.

In operative use it is to be noted that prevention of the removal of the nut fastener 14 from the stud 15 is thus accomplished because the instant invention prevents a proper wrench (not illustrated) from being applied to the nut fastener 14 so that it may be properly rotated and unthreaded from a mating stud 15.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A lug lock, comprising, a housing, a nut fastener received in said housing, a threaded stud typically of a wheel portion of a large automotive vehicle received in said housing, a key operable locking mechanism received in said housing, for preventing unauthorized removal of said nut fastener from a wheel from said automotive vehicle when said locking mechanism is in a locked condition, and a set screw received in said housing, for retaining said locking mechanism is said housing, wherein an opening is provided transversely through said housing and a large diameter portion of the opening freely receives said nut fastener and a smaller diameter portion of the opening freely receives said stud that is threaded into said nut fastener that fastens said wheel to said vehicle.

2. A lug lock as set forth in claim 1, wherein a second opening is provided in one end of said housing and slideably and removably receives said locking mechanism, and said nut fastener is provided with an annular groove in a diametric outer periphery that removably receives a rotatable bolt of said locking mechanism that prevents travel of said nut fastener on said stud.

3. A lug lock a set forth in claim 2, wherein a head is integrally attached to an extending end of said bolt and is defined by a second annular groove in the outer periphery of said bolt, and said head is provided with an arcuate portion at each end and one said arcuate portion engages with an outer periphery of a transverse pin fixedly secured in a third opening provided transversely through said housing when said bolt is rotated.

4. A lug lock as set forth in claim 3, wherein said pin is received in said bolt of said locking mechanism and serves as stop means against the withdrawal of said bolt when sadi bolt has been rotated to locking position, and when said bolt is withdrawn from said nut fastener as said locking mechanism is partially withdrawn from said housing.

5. A lug lock as set forth in claim 4, wherein an elongated groove in one side of said locking mechanism receives said set screw that is received in a threaded fourth opening in on side of said housing, and said set screw serves as stop means against said locking mechanism falling from said housing, when in engagement with one end of the elongated groove.

* * * * *